United States Patent
Li et al.

(10) Patent No.: US 11,211,888 B2
(45) Date of Patent: Dec. 28, 2021

(54) MOTOR PARAMETER TRACKING METHOD AND MOTOR PARAMETER TRACKING SYSTEM

(71) Applicant: AAC Technologies Pte. Ltd., Singapore (SG)

(72) Inventors: Tao Li, Shenzhen (CN); Xuan Guo, Shenzhen (CN); Zheng Xiang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/993,304

(22) Filed: Aug. 14, 2020

(65) Prior Publication Data
US 2020/0412288 A1 Dec. 31, 2020

Related U.S. Application Data

(63) Continuation of application No. PCT/CN2019/093505, filed on Jun. 28, 2019.

(51) Int. Cl.
| | |
|---|---|
| *H02K 33/00* | (2006.01) |
| *H02P 1/00* | (2006.01) |
| *H02P 3/00* | (2006.01) |
| *H02P 23/14* | (2006.01) |
| *H02P 25/032* | (2016.01) |
| *H02P 6/12* | (2006.01) |
| *H02P 23/00* | (2016.01) |

(52) U.S. Cl.
CPC ............... *H02P 23/14* (2013.01); *H02P 6/12* (2013.01); *H02P 23/0022* (2013.01); *H02P 25/032* (2016.02)

(58) Field of Classification Search
CPC .......... H02P 23/14; H02P 25/032; H02P 6/12; H02P 23/0022
USPC ........................................................ 318/119
See application file for complete search history.

(56) References Cited

U.S. PATENT DOCUMENTS

| | | | |
|---|---|---|---|
| 10,564,728 B1* | 2/2020 | Vasudevan | G06F 3/0346 |
| 2013/0307441 A1* | 11/2013 | Schuster | B06B 1/023 |
| | | | 318/127 |
| 2018/0041173 A1* | 2/2018 | Marchais | H03F 3/187 |
| 2020/0044638 A1* | 2/2020 | Lesso | H03K 5/131 |
| 2021/0281202 A1* | 9/2021 | Abdelfattah Aly | G06F 3/016 |

* cited by examiner

*Primary Examiner* — Erick D Glass
(74) *Attorney, Agent, or Firm* — W&G Law Group (57) ABSTRACT

A motor parameter tracking method, which can dynamically track motor parameters includes: exciting, with a voltage excitation signal, a motor to operate, and acquiring at least one actual voltage across two terminals of the motor and an actual current flowing through the motor in an operating state; modelling a voltage error of the motor based on the at least one actual voltage and the actual current to obtain a voltage error function of the motor; and performing iteration on at least one motor parameter based on the voltage error function and a preset iterative step. With the method, the difference between different batches of motors can be adaptively adjusted, and parameter changes caused by a motor temperature, a motor posture and the like can be dynamically tracked. All motor parameters are provided with a same step, which reduces the difficulty of parameter adjustment and the sensitivity of algorithms to parameters.

10 Claims, 4 Drawing Sheets

MOTOR PARAMETER TRACKING METHOD AND MOTOR PARAMETER TRACKING SYSTEM

TECHNICAL FIELD

The present invention relates to the field of micro-electromechanics and, particularly, relates to a motor parameter tracking method and a motor parameter tracking system.

BACKGROUND

With the development and popularization of consumer electronic devices such as smart phones and smart wearable devices, people are pursuing better tactile experience. Linear resonant actuator (LRA) can provide rich vibration experience, and the vibration performance of motors has direct and major influence on tactile experience. In application, the states and parameters of motors may have unexpected changes due to different production batches, different application scenes and different postures. To avoid effects of the state and parameters of a single motor on tactile experience, it is important to track the parameters and perform feedback control of the motor.

A motor parameter tracking method in the related art control motor excitation signal with preset motor parameters, which is usually referred to as an open loop control technology. This technology is easily realized and does not require complex control theories, but it cannot perform self-adaptive adjustment on the difference between motors produced indifference batches, and cannot effectively track parameter changes caused by a temperature of the motor, a posture of the motor and the like.

Therefore, it is necessary to provide a motor parameter tracking method and a motor parameter tracking system which can perform self-adaptive adjustment on the difference between motors produced in difference batches.

SUMMARY

The present invention provides a motor parameter tracking method and a motor parameter tracking system which can perform self-adaptive adjustment on the difference between motors produced in different batches.

A motor parameter tracking method includes:

exciting, with a voltage excitation signal, a motor to operate, and acquiring at least one actual voltage across two terminals of the motor and an actual current flowing through the motor in an operating stat;

modelling a voltage error of the motor based on the at least one actual voltage and the actual current to obtain a voltage error function of the motor; and performing iteration on at least one motor parameter based on the voltage error function and a preset iterative step in such a manner that the at least one motor parameter is dynamically tracked.

As an improvement, the voltage excitation signal is a digital signal, and said exciting, with the voltage excitation signal, the motor to operate includes:

converting, by a digital-to-analog converter, the digital signal into an analog signal; amplifying, by a power amplifier, the analog signal; and exciting, with the amplified analog signal, the motor to operate.

As an improvement, said modelling the voltage error of the motor based on the at least one actual voltage and the actual current to obtain the voltage error function of the motor includes:

obtaining the voltage error function based on a difference between one of the at least one actual voltage and a predicted voltage of each of different sampling points, wherein the predicted voltage is calculated based on the at least one motor parameter and a motor model.

As an improvement, said obtaining the voltage error function based on the difference between the one of the at least one actual voltage and the predicted voltage of each of the different sampling points includes:

calculating the voltage error function based on:

$$\varepsilon_{oev}[n]=v_{om}[n]-v_{cp}[n],$$

where n represents a sampling point index, $v_{cm}$ represents an actual voltage, and $v_{cp}$ represents the predicted voltage.

As an improvement, said calculating the predicted voltage based on the at least one motor parameter and the motor model includes:

calculating the predicted voltage based on:

$$v_{cp}[n] = R_{eb}[n]i_{cm}[n] + L_{eb}[n]\frac{di_{cm}}{dt}[n] + \phi_0[n]u_d[n],$$

where n represents a sampling point index, $R_{eb}$ represents a resistance of the motor, $i_{cm}$ represents the actual current, $L_{eb}$ represents an inductance of the motor, $\phi_0$ represents an electromagnetic force coefficient, and $u_d$ represents a vibrator speed of the motor.

As an improvement, the vibrator speed of the motor is calculated based on:

$$u_d[n]=\sigma_u[n]f_{cp}[n]-\sigma_n[n]f_{cp}[n-2]-a_1[n]u_d[n-1]-a_2[n]u_d[n-2],$$

where n represents the sampling point index, $\sigma_u$, $a_1$ and $a_2$ represent coefficients of a second-order model of the motor, respectively, and $f_{cp}$ is an electromagnetic force.

As an improvement, the electromagnetic force is calculated according to the formula $f_{cp}[n]=\phi_0[n]i_{c\cdot m}[n]$, where n represents the sampling point index, $\phi_0$ represents the electromagnetic force coefficient, and $i_{cm}$ represents the actual current As an improvement, the preset iterative step is set for each of the at least one motor parameter, and said performing the iteration on the at least one motor parameter based on the voltage error function and the preset iterative step in such a manner that the at least one motor parameter is dynamically tracked includes:

performing normalized least mean square adaptive filtering on the at least one motor parameter based on the voltage error function and the preset iterative step to obtain at least one tracking result of the at least one motor parameter.

As an improvement, in one embodiment, the at least one motor parameter comprises a resistance, an inductance, a filter feedback coefficient and an electromagnetic force coefficient, and a tracking result of the resistance is:

$$R_{eb}[n+1] = R_{eb}[n] - \mu \frac{\sum_{m=1}^{frame\_sample}(-\varepsilon_{oev}[m]i_{cm}[m])}{\sum_{m=1}^{frame\_sample}(u^2[m])},$$

where $R_{eb}$ represents the resistance, n represents a sampling point index, μ represents an iterative step, frame_sample represents a total number of samples in each frame, m represents a sample index of each frame, $\varepsilon_{oev}$ represents the voltage error function, $i_{cm}$ represents the actual current, and $u[m]=-i_{cm}[m]$;

a tracking result of the inductance is:

$$L_{eb}[n+1] = L_{eb}[n] - \mu \frac{\sum_{m=1}^{frame\_sample}\left(-\varepsilon_{oev}[m]\frac{di_{cm}}{dt}[m]\right)}{\sum_{m=1}^{frame\_sample}(u^2[m])},$$

where $L_{eb}$ is an inductance, n is a sampling point index, $\mu$ is an iterative step length, frame_sample is a sample total number of each frame, m is a sample index of each frame, $\varepsilon_{oev}$ is a voltage error function, and $i_{cm}$ is an actual current, $$u[m] = -\frac{di_{cm}}{dt}[m];$$

a tracking result of the filter feedback coefficient is:

$$a_k[n+1] = a_k[n] - \mu \frac{\sum_{m=1}^{frame\_sample}(-\varepsilon_{oev}[m]\phi_0[n]\alpha_k[m])}{\sum_{m=1}^{frame\_sample}(u^2[m])},$$

where $a_k$ represents the filter feedback coefficient and comprises $a_1$ and $a_2$, n represents the sampling point index, $\mu$ represents the iterative step, frame_sample represents the total number of samples in each frame, m represents the sample index of each frame, $\varepsilon_{oev}$ represents the voltage error function, $\phi_0$ represents the electromagnetic force coefficient, $i_{cm}$ represents the actual current, and $u[m]=-\phi_0[m]\alpha_k[m]$;

a tracking result of the electromagnetic force coefficient is:

$$\phi_0[n+1] = \phi_0[n] - \mu \frac{\sum_{m=1}^{frame\_sample}(\varepsilon_{oev}[m](-u_d[m] - \phi_0[n]\partial_{\phi u}[m]))}{\sum_{m=1}^{frame\_sample}(u^2[m])},$$

where $\phi_0$ represents the electromagnetic force coefficient, n represents the sampling point index, $\mu$ represents the iterative step, frame_sample represents the total number of samples in each frame, m represents the sample index of each frame, $\varepsilon_{oev}$ represents the voltage error function, $u_d$ represents a vibrator speed of the motor, and $u[m]=-u_d[m]-\phi_0[n]\partial_{\phi u}[m]$.

A motor parameter tracking system includes:

a system control module configured to excite, with a voltage excitation signal, a motor to operate, and configured to acquire an actual voltage across two terminals of the motor and an actual current flowing through the motor in an operating state, a system recognition module configured to model a voltage error of the motor based on the actual voltage and the actual current to obtain a voltage error function of the motor; and a parameter tracking module configured to perform iteration on a motor parameter based on the voltage error function and a preset iterative step in such a manner that the motor parameter is dynamically tracked.

A terminal includes a motor, a motor parameter tracking system configured to control the motor, a memory and processor, and the memory stores a computer program. The computer program, when being executed by the processor, causes the processor to execute the steps of the above method.

There is provided a computer-readable storage medium storing a computer program thereon, and the computer program, when being executed by a processor, causes the processor to execute steps of the above method.

Dynamic tracking of a motor parameter can be achieved by: exciting, with a voltage excitation signal, a motor to operate, and acquiring at least one actual voltage across two terminals of the motor and an actual current flowing through the motor in an operating state; modelling a voltage error of the motor based on the at least one actual voltage and the actual current to obtain a voltage error function of the motor; and performing iteration on at least one motor parameter based on the voltage error function and a preset iterative step in such a manner that the at least one motor parameter is dynamically tracked. With the above motor parameter tracking method, self-adaptive adjustment can be performed on the difference between motors produced in different batches, parameter changes caused by a temperature and a posture of the motor can be dynamically tracked. All motor parameters are provided with a same step, which reduces the difficulty of parameter adjustment and the sensitivity of algorithms to parameters.

DESCRIPTION OF EMBODIMENTS

The present invention will be further described below with reference to the drawings and embodiments.

Figure 1:
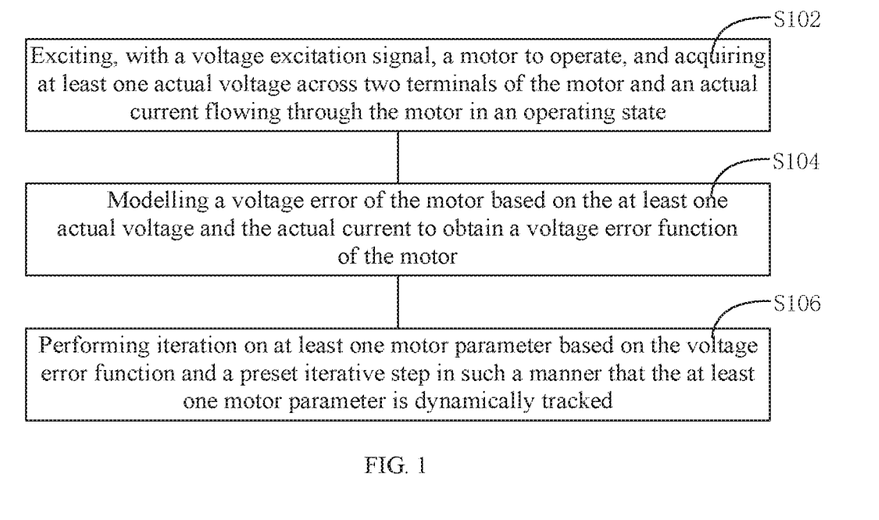
FIG. 1 is a flow chart of a motor parameter tracking method.

FIG. 1 is a flow chart of a motor parameter tracking method. The motor parameter tracking method can be applied to a motor parameter tracking system. In an embodiment, the motor can be a linear motor, namely, a linear resonant actuator, which is a vibration motor that generates an oscillating force along a single axis. For example, the motor can be a linear motor applied to electronic devices such as a smart phone, a tablet computer and a smart wearable device. With the motor parameter tracking method, the difference between motors produced in different batches can be self-adaptively adjusted, thereby realizing dynamic tracking of motor parameters. As shown in FIG. 1, the motor parameter tracking method includes steps 102 to 106.

At step 102, a motor is excited to operate using a voltage excitation signal to acquire an actual voltage across two terminals of the motor and an actual current of the motor in an operating state.

The voltage excitation signal refers to an electrical signal input to an operating circuit of the motor for observing characteristics of the motor. In an embodiment, the voltage excitation signal is a digital signal, and for example, can be white noise.

In an embodiment, the motor parameter tracking system includes a system control module. Through the system control module, the voltage excitation signal (a digital signal) is converted into an analog signal by a digital-to-analog converter; the analog signal is amplified by a power amplifier; and the motor is excited to operate with the amplified analog signal, and meanwhile, the actual voltage across the two terminals of the motor and the actual current of the motor in the operating state are collected.

Figure 2:
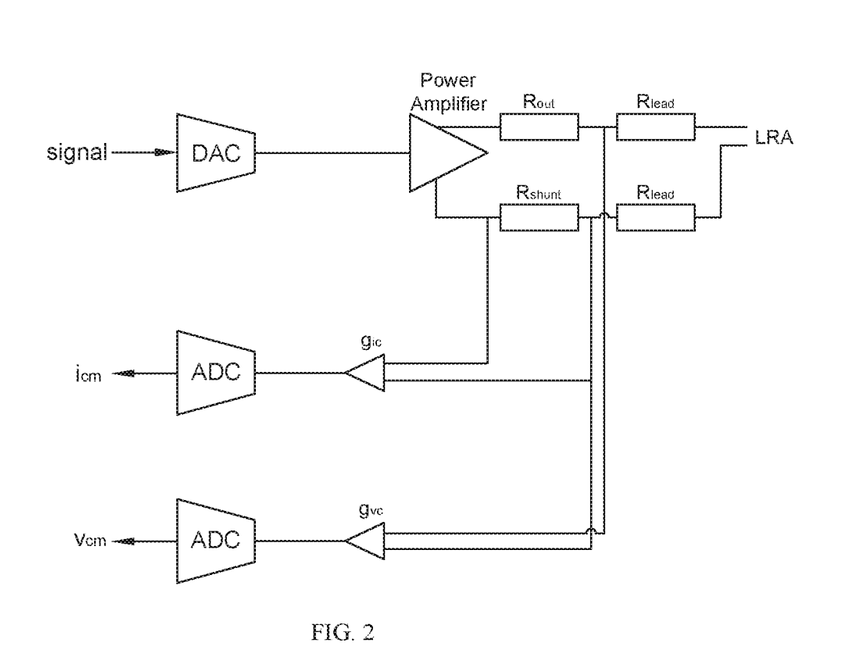
FIG. 2 is a schematic diagram of a system control module.
Figure 3:
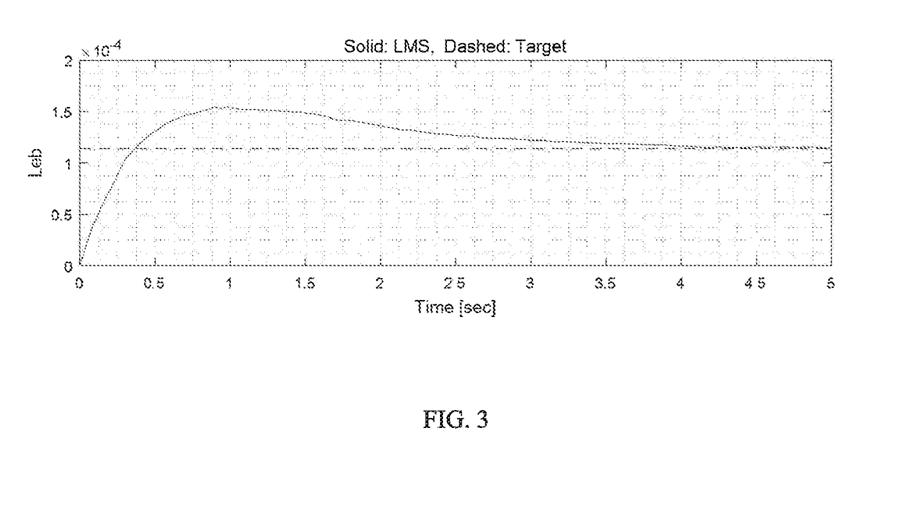
FIG. 3 is a schematic diagram of a parameter tracking result of an inductance.
Figure 4:
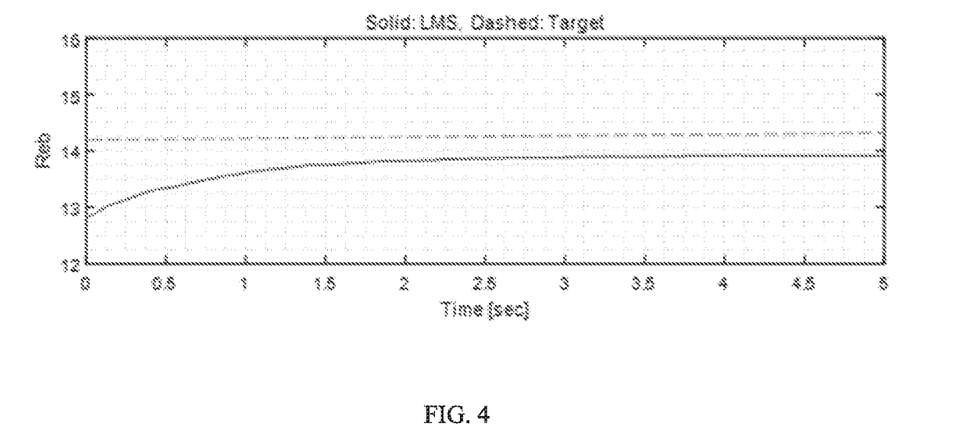
FIG. 4 is a schematic diagram of a parameter tracking result of a resistance.
Figure 5:
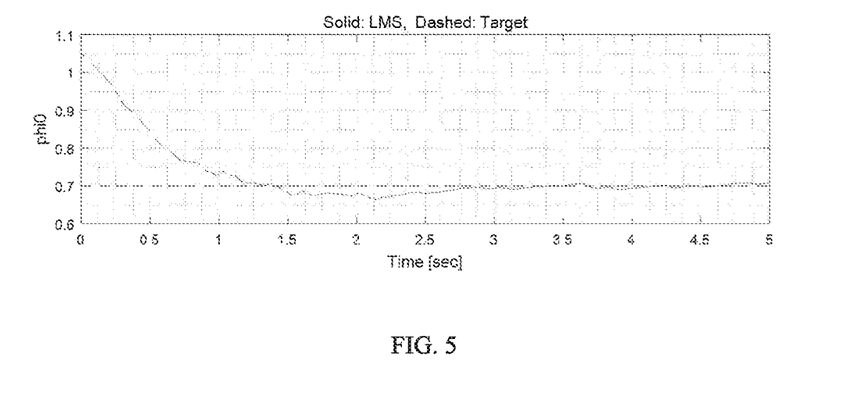
FIG. 5 is a schematic diagram of a parameter tracking result of an electromagnetic force coefficient.
Figure 6:
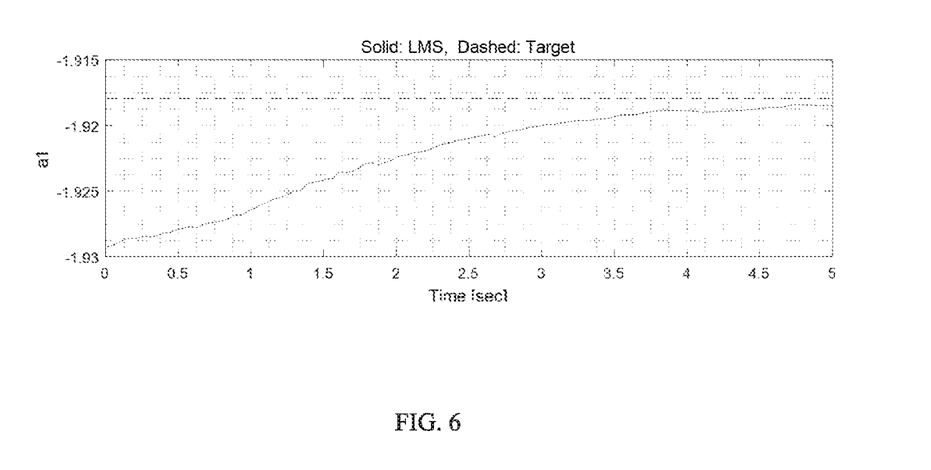
FIG. 6 is a schematic diagram of a parameter tracking result of a filter feedback coefficient.

For example, FIG. 2 shows a schematic diagram of a system control module. The system control module includes hardware devices for signal collection, and is configured to measure and acquire the actual voltage $v_{cm}$ across the two terminals of the motor and the actual current $i_{cm}$ of the motor in the operating state. In an embodiment, the system control module includes a digital-to-analog converter (DAC), an analog-to-digital converter (ADC), and a power amplifier. First, the voltage excitation signal (a digital signal) is converted into an analog signal using the DAC. Second, the analog signal is amplified by the power amplifier. Finally, the motor is excited to operate using the amplified analog signal, and meanwhile, a current signal is collected using a sampling resistor $R_{shunt}$, and a voltage signal is collected using a sampling resistor $R_{lead}$; and the voltage signal and the current signal are converted from analog signals into digital signals using the ADC, so as to obtain the actual voltage $v_{cm}$ across the two terminals of the motor and the actual current $i_{cm}$ of the motor in the operating state.

At step 104, a voltage error of the motor are modeled based on the actual voltage and the actual current to acquire a voltage error function of the motor.

In an embodiment, the voltage error function is obtained based on a difference between the actual voltage and a predicted voltage of each of the different sampling points. That is, the voltage error function is defined as an error between the predicted voltage and the actual voltage.

In an embodiment, the voltage error function is calculated bases on:

$$\varepsilon_{oev}[n] = v_{cm}[n] - v_{cp}[n] \quad (1),$$

where n represents a sampling point index, $v_{cm}$ represents the actual voltage, and $v_{cp}$ represents the predicted voltage.

In an embodiment, the predicted voltage in formula (1) can be calculated according to the motor parameter and a motor model. In an embodiment, the predicted voltage can be calculated according to:

$$v_{cp}[n] = R_{eb}[n]i_{cm}[n] + L_{eb}[n]\frac{di_{cm}}{dt}[n] + \phi_0[n]u_d[n], \quad (2)$$

where n represents a sampling point index, $R_{eb}$ represents a resistance of the motor, $i_{cm}$ represents the actual current, $L_{eb}$ represents an inductance of the motor, $\phi_0$ represents an electromagnetic force coefficient, and $u_d$ represents a vibrator speed of the motor.

The derivative of current to time $$\frac{di_{cm}}{dt}[n]$$

in formula (2) is calculated using the formula:

$$\frac{di_{cm}}{dt}[n] = \frac{i_{cm}[n] - i_{cm}[n-1]}{T_s}, \quad (3)$$

where n represents the sampling point index, $i_{cm}$ represents the actual current, and $T_s$ represents a sampling period of a digital signal.

The vibrator speed of the motor $u_d$ in formula (2) is calculated using the following formula:

$$u_d[n] = \sigma_u[n]f_{cp}[n] - \sigma_u[n]f_{cp}[n-2] - a_1[n]u_d[n-1] - a_2[n]u_d[n-2] \quad (4),$$

where n represents the sampling point index, $\sigma_u$, $a_1$ and $a_2$ represent coefficients of a second-order model of the motor, and $f_{cp}$ represents an electromagnetic force.

The electromagnetic force $f_{cp}$ in formula (4) is calculated using the following formula:

$$f_{cp}[n] = \phi_0[n]i_{cm}[n] \quad (5),$$

where n represents the sampling point index, $\phi_0$ represents an electromagnetic force coefficient, and $i_{cm}$ represents the actual current.

At step 106, an iteration is performed on the motor parameter based on the voltage error function and a preset iterative step, which achieves dynamic tracking of the motor parameter.

In an embodiment, the dynamic tracking of the motor parameter is performed based on the voltage error function and a normalized least mean square (NLMS) adaptive filtering algorithm. That is, the normalized least mean square adaptive filtering is performed based on an error signal of the actual voltage $v_{an}$ across the two terminals of the motor and the predicted voltage $v_{cp}$ across the two terminals of the motor.

In an embodiment, a same preset iterative step is set for all motor parameters, and the iteration is performed on the motor parameters according to the iterative step of the motor parameters and a gradient of the voltage error function using the NLMS algorithm so as to obtain tracking results of the motor parameters. With the NLMS algorithm, steps of all motor parameters can be set as a same value, instead of setting different iterative steps for all motor parameters, respectively, which reduces the difficulty of parameter adjustment and the sensitivity of algorithms to parameters.

In an embodiment, the motor parameters include a resistance, an inductance, a filter feedback coefficient and an electromagnetic force coefficient. During the frame-by-frame iteration of the NLMS algorithm, a definition and the calculation formula of each motor parameter are as follows.

The calculation formula and the tracking result of the resistance are:

$$\frac{\partial}{\partial R_{eb}}\varepsilon_{oev}[n] = -i_{cm}[n], \text{ and} \quad (6)$$

$$R_{eb}[n+1] = R_{eb}[n] - \mu \frac{\sum_{m=1}^{frame\_sample}(-\varepsilon_{oev}[m]i_{cm}[m])}{\sum_{m=1}^{frame\_sample}(u^2[m])}, \quad (7)$$

where $R_{eb}$ represents the resistance, n represents the sampling point index, µ represents an iterative step, frame_sample represents a total number of samples in each frame, m represents a sample index of each frame, $\varepsilon_{oev}$ represents the voltage error function, and $i_{cm}$ represents the actual current. In formula (7), $u[m]=-i_{cm}[m]$.

The calculation formula and the tracking result of the inductance are:

$$\frac{\partial}{\partial L_{eb}}\varepsilon_{oev}[n] = -\frac{di_{cm}}{dt}[n], \text{ and} \qquad (8)$$

$$L_{eb}[n+1] = L_{eb}[n] - \mu \frac{\sum_{m=1}^{frame\_sample}\left(-\varepsilon_{oev}[m]\frac{di_{cm}}{dt}[m]\right)}{\sum_{m=1}^{frame\_sample}(u^2[m])}, \qquad (9)$$

where $L_{eb}$ represents the inductance, n represents the sampling point index, $\mu$ represents an iterative step, frame_sample represents the total number of samples in each frame, m represents a sample index of each frame, $\varepsilon_{oev}$ represents the voltage error function, $i_{cm}$ represents the actual current. In formula (9), $$u[m] = -\frac{di_{cm}}{dt}[m].$$

The calculation formula and the tracking result of the filter feedback coefficient are:

$$\frac{\partial}{\partial a_k}\varepsilon_{oev}[n] = -\phi_0[n]\alpha_k[n], \qquad (10)$$

$$\alpha_k[n] = \frac{\partial}{\partial a_k}u_d[n] = -u_d[n-k] - a_1[n]\alpha_k[n-1] - a_2[n]\alpha_k[n-2], \qquad (11)$$

and $$a_k[n+1] = a_k[n] - \mu \frac{\sum_{m=1}^{frame\_sample}(-\varepsilon_{oev}[m]\phi_0[n]\alpha_k[m])}{\sum_{m=1}^{frame\_sample}(u^2[m])}, \qquad (12)$$

where $a_k$ represents the filter feedback coefficient and includes $a_1$ and $a_2$, n represents a sampling point index, $\mu$ represents an iterative step, frame_sample represents a total number of samples in each frame, m represents a sample index of each frame, $\varepsilon_{oev}$ represents the voltage error function, and $\phi_0$ represents the electromagnetic force coefficient. In formula (12), $u[m]=-\phi_0[m]\alpha_k[m]$.

The calculation formula and the tracking result of the electromagnetic force coefficient are:

$$\frac{\partial}{\partial \phi_0}\varepsilon_{oev}[n] = -u_d[n] - \phi_0[n]\partial_{\phi u}[n], \qquad (13)$$

$$\partial_{\phi u}[n] = \qquad (14)$$
$$\sigma_u[n](i_{cm}[n] - i_{cm}[n-2]) - a_1[n]\partial_{\phi u}[n-1] - a_2[n]\partial_{\phi u}[n-2], \text{ and}$$

$$\phi_0[n+1] = \phi_0[n] - \mu \frac{\sum_{m=1}^{frame\_sample}(-\varepsilon_{oev}[m](-u_d[m] - \phi_0[n]\partial_{\phi u}[m]))}{\sum_{m=1}^{frame\_sample}(u^2[m])}, \qquad (15)$$

where $\phi_0$ represents the electromagnetic force coefficient, n represents a sampling point index, $\mu$ represents an iterative step, frame_sample represents a total number of samples in each frame, m represents a sample index of each frame, $\varepsilon_{oev}$ represents the voltage error function, $u_d$ represents the vibrator speed of the motor. In formula (15), $u[m]=-u_d[m]-\phi_0[n]\partial_{\phi u}[m]$.

In the motor parameter tracking method provided by the embodiments of the present invention, the motor is excited to operate using the voltage excitation signal to acquire the actual voltage across two terminals of the motor and the actual current of the motor in the operating state, the voltage error of the motor are modeled based on the actual voltage and the actual current to acquire the voltage error function of the motor, and the iteration is performed on the motor parameter based on the voltage error function and the preset iterative step. With the above motor parameter tracking method, motor parameters can be dynamically tracked, a self-adaptive adjustment can be performed on the difference between motors produced in different batches, so that parameter changes caused by a motor temperature, a motor posture and the like can be dynamically tracked. Further, the same step is set for all motor parameters, which can reduce the difficulty of parameter adjustment and the sensitivity of algorithms to parameters.

In an embodiment, an experimental device including the linear motor can perform the parameters tracking on the linear motor. For example, white noise is used as the voltage excitation signal to run the motor parameter tracking system, and the parameters of the linear motor are tracked using the NLMS algorithm in unit of frame.

Some parameters in the NLMS algorithm are set as shown in Table 1 below, in which an original signal sampling rate can be understood as a sampling frequency of the excitation signal, and an NLMS signal sampling rate can be understood as a sampling frequency of the NLMS algorithm.

TABLE 1

| NLMS Algorithm Parameters | | |
| --- | --- | --- |
| Parameter | Unit | Set Value |
| Original signal sampling rate | Hz | 48,000 |
| NLMS signal sampling rate | Hz | 4,000 |
| Frame length | ms | 44 |
| Parameter step | / | 0.07 |

FIG. 3 to FIG. 6 show the motor parameter tracking results of the inductance, resistance, electromagnetic force coefficient and filter feedback coefficient, respectively. In each figure, the solid line indicates the algorithm tracking parameter whose initial value can be arbitrarily set according to the system; and the dashed line indicates a rated design parameter of the motor. Comparing the algorithm tracking results with the designed parameters in FIG. 3 to FIG. 6, it can be concluded that the algorithm tracking parameter of each motor parameter gradually approaches the rated design parameter of the motor over time. That is, the motor parameter tracking method in this embodiment effectively realizes dynamic tracking of the motor parameters.

Figure 7:
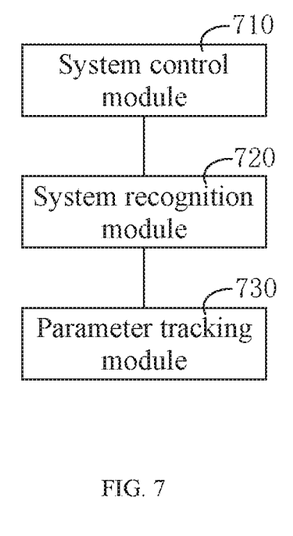
FIG. 7 is a block diagram of a motor parameter tracking system.

Based on the same inventive concept, a motor parameter tracking system is provided. FIG. 7 is a block diagram of a motor parameter tracking system. The system includes a system control module 710, a system recognition module 720 and a parameter tracking module 730.

The system control module 710 is configured to excite a motor to operate using a voltage excitation signal to acquire an actual voltage across two terminals of the motor and an actual current of the motor in an operating state.

The system recognition module 720 is configured to model a voltage error of the motor based on the actual voltage and the actual current to acquire a voltage error function of the motor.

The parameter tracking module 730 is configured to perform iteration on a motor parameter based on the voltage error function and a preset iterative step, which achieves dynamic tracking of the motor parameter.

The above motor parameter tracking system provided by the embodiments can self-adaptively adjust the difference between motors produced in different batches, parameter changes caused by the motor temperature, the motor posture and the like can be dynamically tracked. The same step are set for all motor parameters, which can reduce the difficulty of parameter adjustment and the sensitivity of algorithms to parameters.

An embodiment of the present invention provides a terminal, the terminal includes a motor, a motor parameter tracking system configured to control the motor, a memory and processor. The memory stores a computer program which, when being executed by the processor, causes the processor to execute the motor parameter tracking method described in the above embodiments.

An embodiment of the present invention provides a computer-readable storage medium. One or more non-transitory computer readable storage media including computer-executable instructions are provided. When the computer-executable instructions are executed by one or more processors, the one or more processors execute the motor parameter tracking method described in the above embodiments.

An embodiment of the present invention provides a computer program product. A computer program product including instructions. When the instructions are executed by a computer, the computer executes the motor parameter tracking method described in the above embodiments.

The above are just the exemplary embodiments of the present invention. It should be noted that any improvements made within the creative concepts of the present invention shall fall into the protection scope of the present invention.

What is claimed is:

1. A motor parameter tracking method, comprising:
exciting, with a voltage excitation signal, a motor to operate, and acquiring at least one actual voltage across two terminals of the motor and an actual current flowing through the motor in an operating state;
modelling a voltage error of the motor based on the at least one actual voltage and the actual current to obtain a voltage error function of the motor; and
performing iteration on at least one motor parameter based on the voltage error function and a preset iterative step in such a manner that the at least one motor parameter is dynamically tracked;
said modelling the voltage error of the motor based on the at least one actual voltage and the actual current to obtain the voltage error function of the motor comprises:
obtaining the voltage error function based on a difference between one of the at least one actual voltage and a predicted voltage of each of different sampling points, wherein the predicted voltage is calculated based on the at least one motor parameter and a motor model.

2. The motor parameter tracking method as described in claim 1, wherein the voltage excitation signal is a digital signal, and said exciting, with the voltage excitation signal, the motor to operate comprises:
converting, by a digital-to-analog converter, the digital signal into an analog signal;
amplifying, by a power amplifier, the analog signal; and
exciting, with the amplified analog signal, the motor to operate.

3. The motor parameter tracking method as described in claim 1, wherein said obtaining the voltage error function based on the difference between the one of the at least one actual voltage and the predicted voltage of each of the different sampling points comprises:
calculating the voltage error function based on:

$$\varepsilon_{oev}[n]=v_{cm}[n]-v_{cp}[n],$$

where n represents a sampling point index, $v_{cm}$ represents an actual voltage, and $v_{cp}$ represents the predicted voltage.

4. The motor parameter tracking method as described in claim 1, wherein said calculating the predicted voltage based on the at least one motor parameter and the motor model comprises:
calculating the predicted voltage based on:

$$v_{cp}[n] = R_{eb}[n]i_{cm}[n] + L_{eb}[n]\frac{di_{cm}}{dt}[n] + \phi_0[n]u_d[n],$$

where n represents a sampling point index, $R_{eb}$ represents a resistance of the motor, $i_{cm}$ represents the actual current, $L_{eb}$ represents an inductance of the motor, $\phi_0$ represents an electromagnetic force coefficient, and $u_d$ represents a vibrator speed of the motor.

5. The motor parameter tracking method as described in claim 4, wherein the vibrator speed of the motor is calculated based on:

$$u_d[n]=\sigma_u[n]f_{cp}[n]-\sigma_n[n]f_{cp}[n-2]-a_1[n]u_d[n-1]-a_2[n]u_d[n-2],$$

where n represents the sampling point index, $\sigma_u$, $a_1$ and $a_2$ represent coefficients of a second-order model of the motor, respectively, and $f_{cp}$ is an electromagnetic force.

6. The motor parameter tracking method as described in claim 5, wherein the electromagnetic force is calculated based on:

$$f_{cp}[n]=\phi_0[n]i_{cm}[n],$$

where n represents the sampling point index, $\phi_0$ represents the electromagnetic force coefficient, and icm represents the actual current.

7. The motor parameter tracking method as described in claim 1, wherein the preset iterative step is set for each of the at least one motor parameter, and said performing the iteration on the at least one motor parameter based on the voltage error function and the preset iterative step in such a manner that the at least one motor parameter is dynamically tracked comprises:
performing normalized least mean square adaptive filtering on the at least one motor parameter based on the voltage error function and the preset iterative step to obtain at least one tracking result of the at least one motor parameter.

8. The motor parameter tracking method as described in claim 7, wherein the at least one motor parameter comprises a resistance, an inductance, a filter feedback coefficient and an electromagnetic force coefficient, and a tracking result of the resistance is:

$$R_{eb}[n+1] = R_{eb}[n] - \mu \frac{\sum_{m=1}^{frame\_sample}(-\varepsilon_{oev}[m]i_{cm}[m])}{\sum_{m=1}^{frame\_sample}(u^2[m])},$$

where $R_{eb}$ represents the resistance, n represents a sampling point index, $\mu$ represents an iterative step, frame_sample represents a total number of samples in each frame, m represents a sample index of each frame, $\varepsilon_{oev}$ represents the voltage error function, $i_{cm}$ represents the actual current, and $u[m]=-i_{cm}[m]$;

a tracking result of the inductance is:

$$L_{eb}[n+1] = L_{eb}[n] - \mu \frac{\sum_{m=1}^{frame\_sample}\left(-\varepsilon_{oev}[m]\frac{di_{cm}}{dt}[m]\right)}{\sum_{m=1}^{frame\_sample}(u^2[m])},$$

where $L_{eb}$ represents the inductance, n represents the sampling point index, $\mu$ represents the iterative step, frame_sample represents the total number of samples in each frame, m represents a sample index of each frame, $\varepsilon_{oev}$ represents the voltage error function, $i_{cm}$ represents the actual current, and $$u[m] = -\frac{di_{cm}}{dt}[m];$$

a tracking result of the filter feedback coefficient is:

$$a_k[n+1] = a_k[n] - \mu \frac{\sum_{m=1}^{frame\_sample}(-\varepsilon_{oev}[m]\phi_0[n]\alpha_k[m])}{\sum_{m=1}^{frame\_sample}(u^2[m])},$$

where $a_k$ represents the filter feedback coefficient and comprises $a_1$ and $a_2$, n represents the sampling point index, $\mu$ represents the iterative step, frame_sample represents the total number of samples in each frame, m represents the sample index of each frame, $\varepsilon_{oev}$ represents the voltage error function, $\phi_0$ represents the electromagnetic force coefficient, $i_{cm}$ represents the actual current, and $u[m]=-\phi_0[m]\alpha_k[m]$; and a tracking result of the electromagnetic force coefficient is:

$$\phi_0[n+1] = \phi_0[n] - \mu \frac{\sum_{m=1}^{frame\_sample}(\varepsilon_{oev}[m](-u_d[m] - \phi_0[n]\partial_{\phi u}[m]))}{\sum_{m=1}^{frame\_sample}(u^2[m])},$$

where $\phi_0$ represents the electromagnetic force coefficient, n represents the sampling point index, $\mu$ represents the iterative step, frame_sample represents the total number of samples in each frame, m represents the sample index of each frame, $\varepsilon_{oev}$ represents the voltage error function, $u_d$ represents a vibrator speed of the motor, and $u[m]=-u_d[m]-\phi_0[n]\partial_{\phi u}[m]$.

9. A terminal, comprising:

a motor;

a motor parameter tracking system configured to control the motor;

a memory; and a processor, wherein the memory stores a computer program, and the computer program, when being executed by the processor, causes the processor to execute steps of the method according to claim 1.

10. A computer-readable storage medium, storing a computer program thereon, wherein the computer program, when being executed by a processor, causes the processor to execute steps of the method according to claim 1.

* * * * *